(12) United States Patent
Choi et al.

(10) Patent No.: US 10,403,908 B2
(45) Date of Patent: Sep. 3, 2019

(54) STACK STRUCTURE FOR FUEL CELL

(71) Applicant: MICO LTD., Gyeonggi-do (KR)

(72) Inventors: Sung Jin Choi, Anseong-si (KR);
Chong Sik Lim, Suwon-si (KR); Ki Moon Han, Anseong-si (KR); Song Ho Choi, Anseong-si (KR)

(73) Assignee: MICO CO., LTD., Anseong-si (KR)

( * ) Notice: Subject to any disclaimer, the term of this patent is extended or adjusted under 35 U.S.C. 154(b) by 302 days.

(21) Appl. No.: 14/652,325

(22) PCT Filed: Nov. 21, 2013

(86) PCT No.: PCT/KR2013/010647
§ 371 (c)(1),
(2) Date: Jun. 15, 2015

(87) PCT Pub. No.: WO2014/092357
PCT Pub. Date: Jun. 19, 2014

(65) Prior Publication Data
US 2015/0372320 A1 Dec. 24, 2015

(30) Foreign Application Priority Data
Dec. 14, 2012 (KR) ........................ 10-2012-0146062

(51) Int. Cl.
*H01M 8/0254* (2016.01)
*H01M 8/241* (2016.01)
(Continued)

(52) U.S. Cl.
CPC ....... *H01M 8/0254* (2013.01); *H01M 8/0271* (2013.01); *H01M 8/04089* (2013.01);
(Continued)

(58) Field of Classification Search
CPC ............. H01M 8/0271; H01M 8/0273; H01M 8/0276; H01M 8/2425; H01M 8/0254;
(Continued)

(56) References Cited

U.S. PATENT DOCUMENTS

| 6,096,451 A * | 8/2000 | Shiratori | C04B 37/005 |
| | | | 429/465 |
| 6,338,492 B1 * | 1/2002 | Schilling | H01M 8/242 |
| | | | 277/630 |

(Continued)

FOREIGN PATENT DOCUMENTS

| CN | 101473478 A | 7/2009 |
| EP | 1294035 A2 | 3/2003 |

(Continued)

OTHER PUBLICATIONS

Machine Translation and Abstract in English of JP 2007207570A. (Year: 2007).*

*Primary Examiner* — Miriam Stagg
*Assistant Examiner* — Claire L Roe
(74) *Attorney, Agent, or Firm* — Norton Rose Fulbright US LLP

(57) ABSTRACT

Provided is a fuel cell stack structure. The fuel cell stack structure includes first and second cell modules and first and second separation plates. In each of the first and second cell modules, one or more fuel cells generating electricity are stacked, and each of the fuel cells includes an electrolyte layer, and a cathode layer and an anode layer formed on both surfaces of the electrolyte layer, respectively, and generates electricity. The first and second separation plates are electrically connected to the first and second cell modules, respectively, and each separation plate has an air hole and a fuel hole at edges to provide an air including oxygen and a fuel gas including hydrogen to the cathode layer and the anode layer, respectively. At least one separation plate has a (Continued)

sealing unit for sealing the air hole and the fuel hole, and has a protruded convex at a different part from the sealing unit to improve an electrical contact with the other separation plate.

10 Claims, 6 Drawing Sheets

(51) Int. Cl.
  *H01M 8/2483* (2016.01)
  *H01M 8/2457* (2016.01)
  *H01M 8/2425* (2016.01)
  *H01M 8/0271* (2016.01)
  *H01M 8/04089* (2016.01)
  *H01M 8/249* (2016.01)

(52) U.S. Cl.
  CPC ........... *H01M 8/241* (2013.01); *H01M 8/249* (2013.01); *H01M 8/2425* (2013.01); *H01M 8/2457* (2016.02); *H01M 8/2483* (2016.02); *H01M 2300/0074* (2013.01)

(58) Field of Classification Search
  CPC .. H01M 8/249; H01M 8/2485; H01M 8/0258; H01M 8/0256; H01M 8/026; H01M 8/0202; H01M 2300/0074
  USPC ....................................................... 429/465
  See application file for complete search history.

(56) References Cited

U.S. PATENT DOCUMENTS

| | | | |
|---|---|---|---|
| 6,472,094 B1 | 10/2002 | Nonoyama et al. ............ 429/34 |
| 7,381,493 B2 | 6/2008 | Ishikawa et al. ............. 429/129 |
| 2001/0028974 A1* | 10/2001 | Nakata ................ H01M 8/0204 |
| | | | 429/517 |
| 2003/0232234 A1* | 12/2003 | Cisar ................... H01M 8/0206 |
| | | | 429/437 |
| 2004/0146773 A1* | 7/2004 | Doshi ................. H01M 8/0247 |
| | | | 429/457 |
| 2011/0236786 A1* | 9/2011 | Iizuka ................. H01M 8/0273 |
| | | | 429/482 |

FOREIGN PATENT DOCUMENTS

EP     1294035 B1    11/2011
JP     2007207570 A  *  8/2007

* cited by examiner

[FIG. 1]
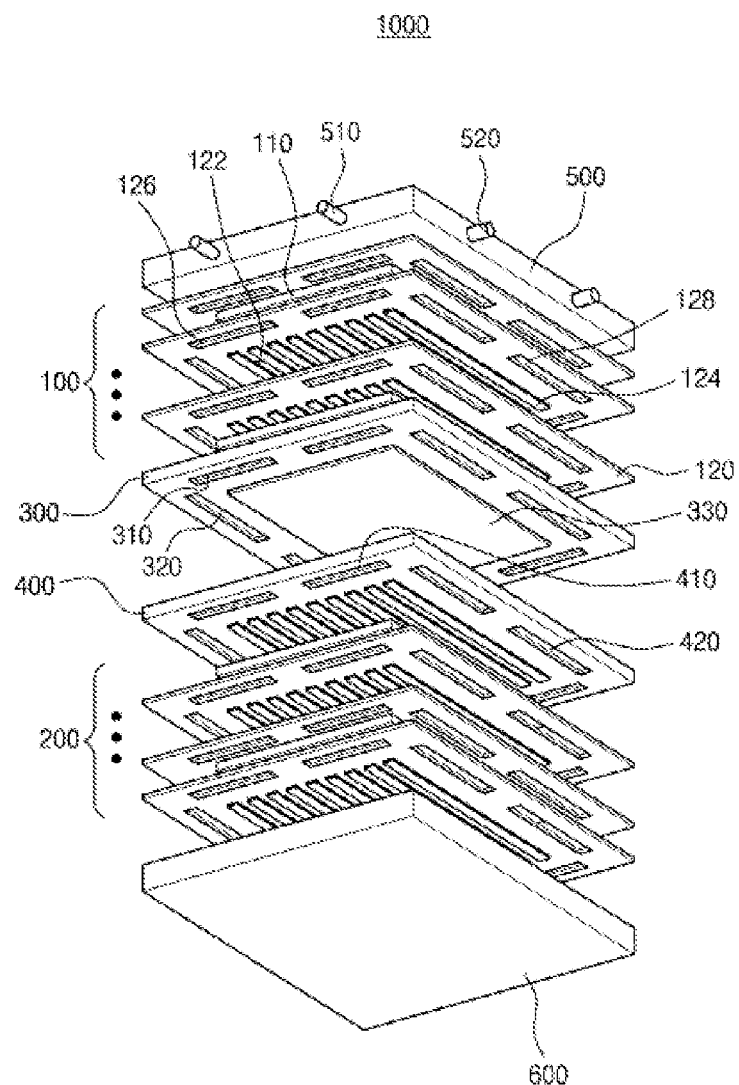

[FIG. 2]
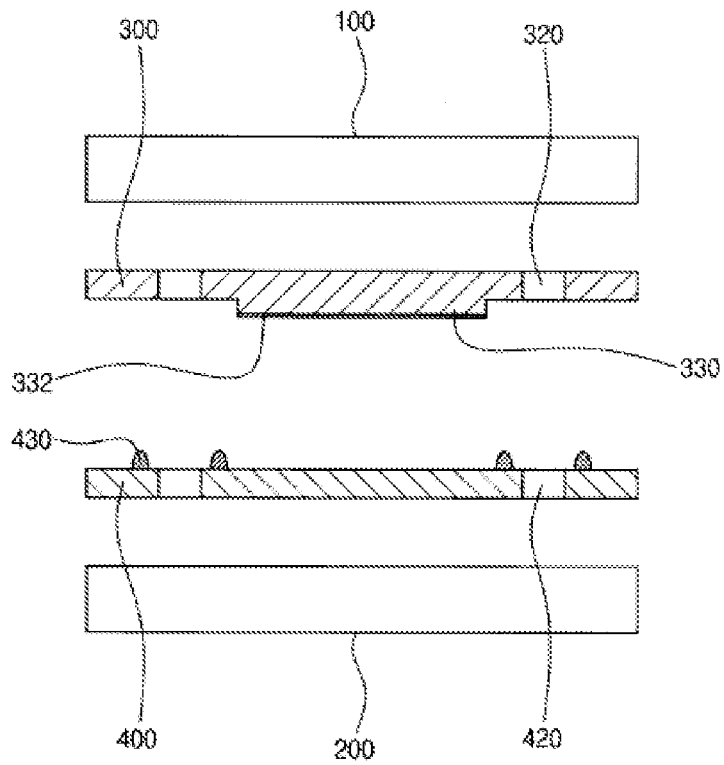
[FIG. 3A]
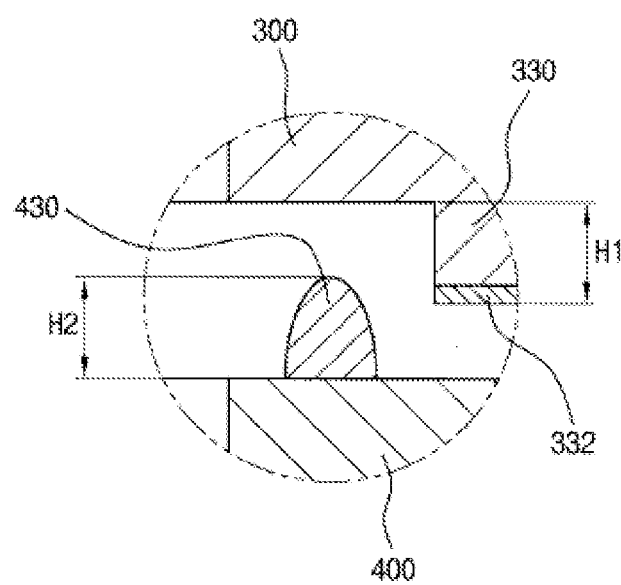

[FIG. 3B]
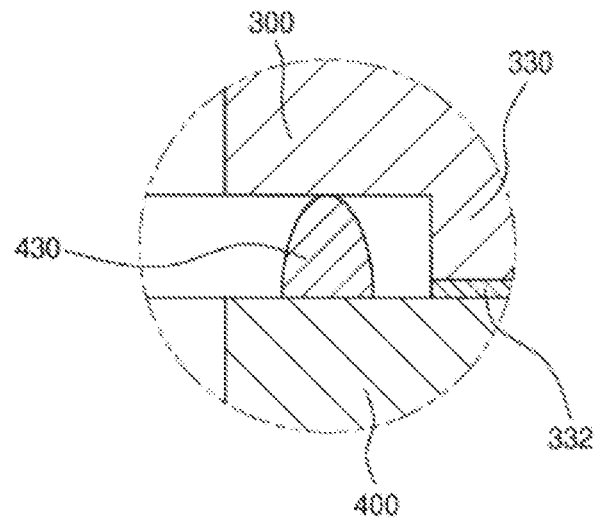
[FIG. 4]
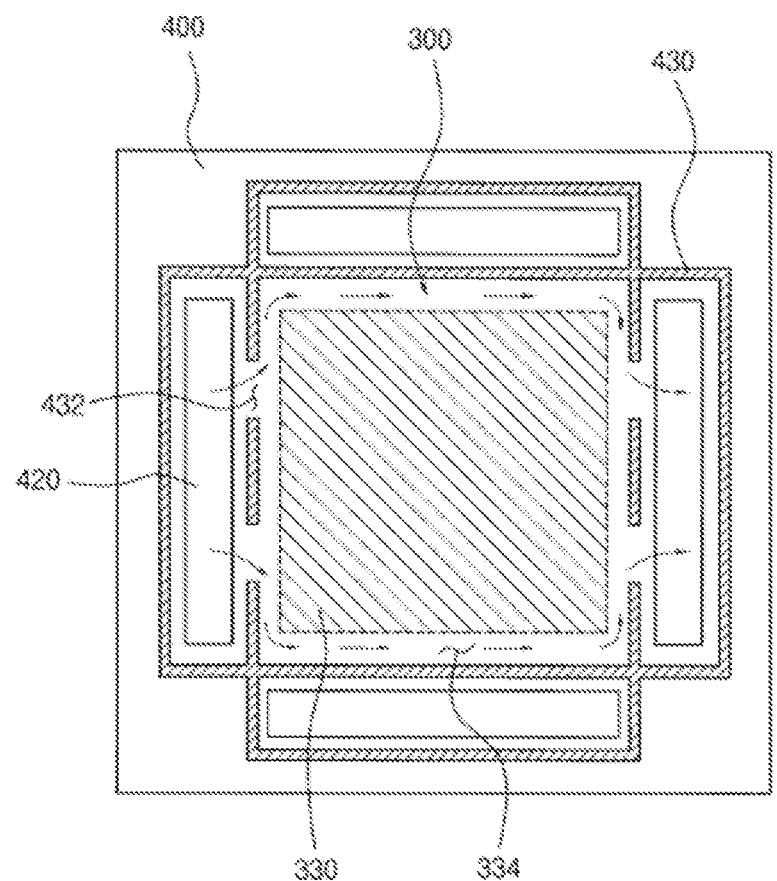

[FIG. 5]
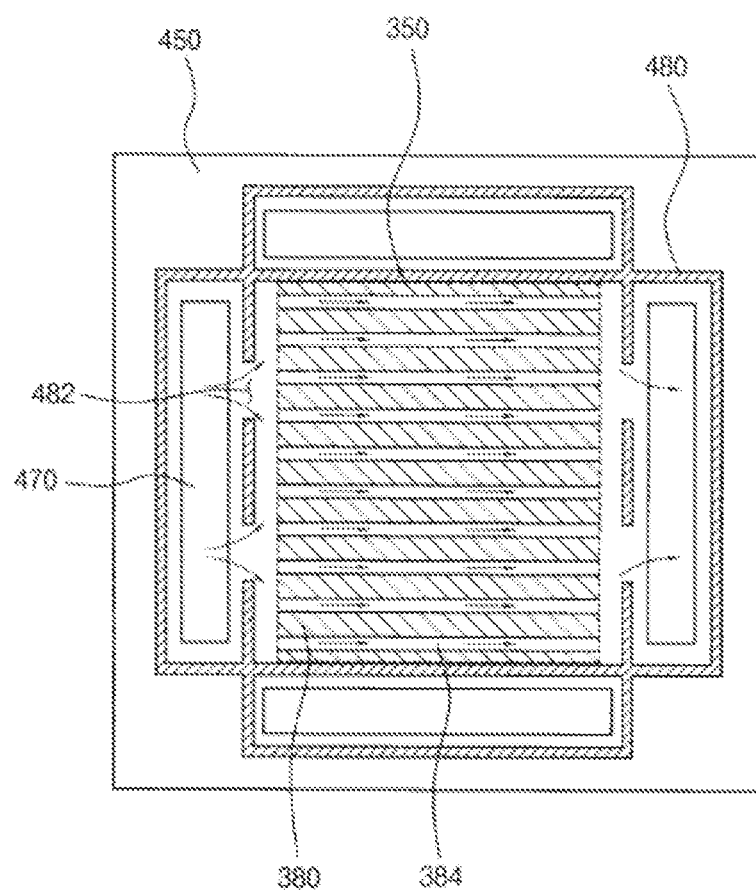

[FIG. 6]
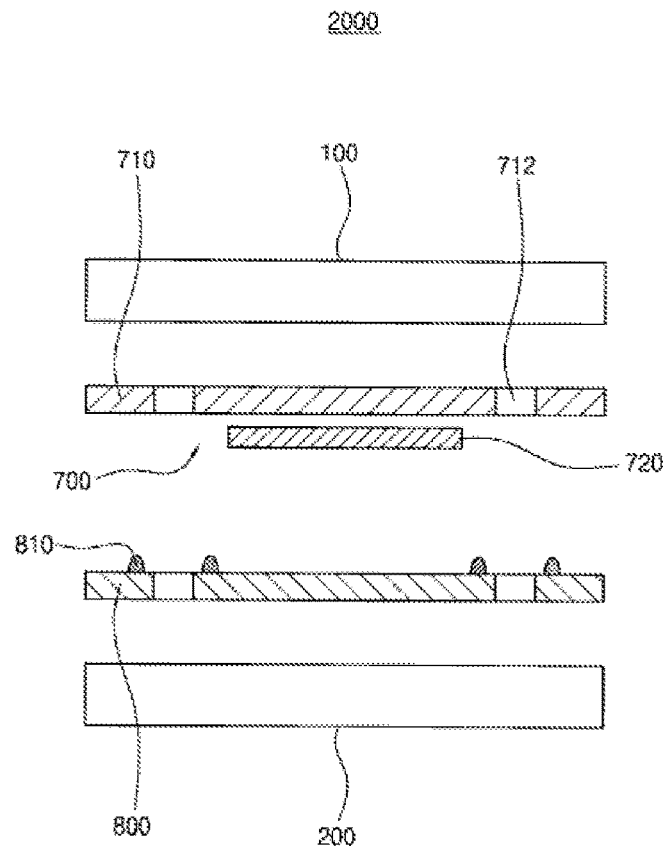
[FIG. 7A]
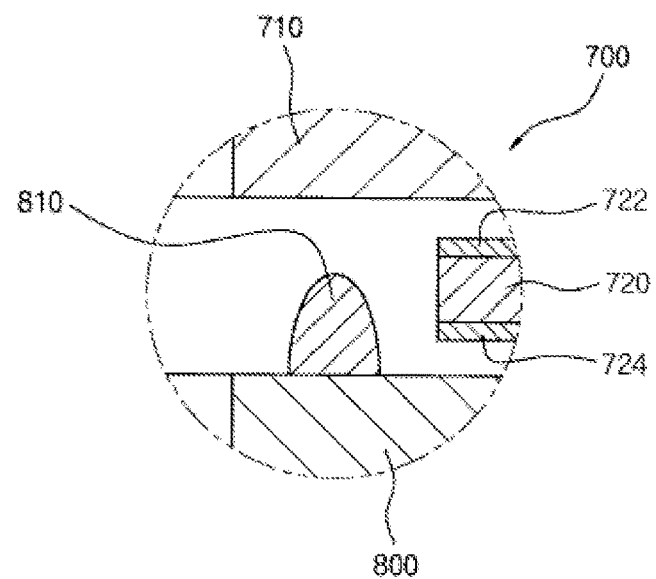

[FIG. 7B]
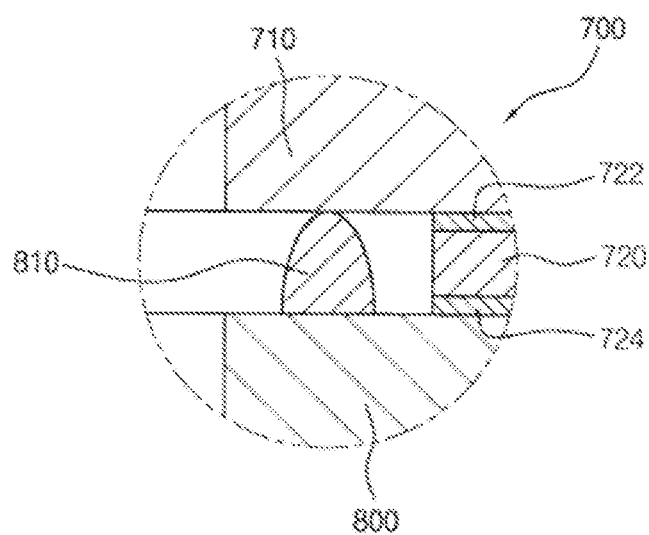

STACK STRUCTURE FOR FUEL CELL

CROSS-REFERENCED TO RELATED APPLICATION

This application is a national phase application under 35 U.S.C. § 371 of International Patent Application No. PCT/KR2013/010647 filed on Nov. 21, 2013, which claims priority to and the benefit of Korean Patent Application No. 10-2012-0146062, filed on Dec. 14, 2012. The contents of the referenced applications are incorporated herein by reference in its entirety.

BACKGROUND

1. Field of the Invention

The present invention relates to a fuel cell stack structure, and more particularly, to a fuel cell stack structure in which at least one defective fuel cell among a plurality of stacked fuel cells to increase the amount of electric power is capable of being easily replaced.

2. Discussion of Related Art

Generally, a fuel cell is a generator which includes a cathode layer and an anode layer on respective surfaces of an electrolyte layer, and generates electricity by an electrochemical reaction between hydrogen and oxygen through ion conduction occurring at the electrolyte layer when an air including oxygen and a fuel gas including hydrogen are supplied to the cathode layer and the anode layer, respectively.

Such a fuel cell is a highly efficient and pollution-free generator having a simple energy conversion process and, in principle, generates energy through oxidation of hydrogen. Because of such an environmentally friendly characteristic, recently, studies of fuel cells have been actively progressing.

Particularly, among fuel cells, a solid oxide fuel cell (SOFC) is a fuel cell operated at a high temperature of approximately 600 to 1000° C. using a ceramic as an electrolyte, and has various advantages such as the highest efficiency among the various types of fuel cells including a molten carbonate fuel cell (MCFC), a phosphoric acid fuel cell (PAFC), a polymer electrolyte fuel cell (PEFC), etc., less pollution, and enabling combined cycle power generation without a fuel processor.

A fuel cell having a structure of an electrolyte layer, a cathode layer and an anode layer is usually called a single cell. Since electricity generated by the single cell is approximately less than 1 V, which is ineffective, a technique of increasing a generated voltage by stacking a plurality of single cells in the form of a stack structure has received attention.

In addition, consequently, with the tendency to increase the number of stacked single cells to further increase the amount of electric power generated from the stack structure, first and second separation plates electrically connected to each other are disposed between the single cells to only change a single defective cell when defects are found in the single cells. Here, in each of the first and second separation plates, an air hole and a fuel hole are disposed to provide an air and a fuel gas to the cathode layer and the anode layer, and a sealing member is disposed to seal the holes.

However, the first and second separation plates have an unstable electrical contact due to a height of the sealing member, or fine unevenness by a processing error, which is caused by a difficulty in processing the plates to a perfect plane, and have an oxidized contact surface in a space formed by the unstable contact, thereby increasing an electrical resistance between the first and second separation plates. Particularly, when the single cells are solid oxide fuel cells (SOFCs), their operating temperature are very high, for example, approximately 600 to 1000° C., and thus the contact surface may be more easily formed, thereby further increasing the electrical resistance. When the electrical resistance is increased as described above, collection efficiency of electricity generated from the single cells may be degraded.

SUMMARY OF THE INVENTION

The present invention is directed to providing a fuel cell stack structure, which has a stable electrical contact between first and second separation plates disposed to separate fuel cells into one or more in number.

In one aspect, the present invention provides a fuel cell stack structure, which includes first and second cell modules and first and second separation plates.

In each of the first and second cell modules, at least one fuel cell which includes an electrolyte layer, and a cathode layer and an anode layer formed on both surfaces of the electrolyte layer, and generates electricity, is stacked. The first and second separation plates are electrically connected to each other at a part in which the first and second cell modules face each other, and at least one separation plate has a protruded convex to improve an electrical contact with the other.

Each of the first and second separation plates according to the exemplary embodiment has an air hole and a fuel hole in edges to provide an air including oxygen and a fuel gas including hydrogen to the cathode layer and the anode layer, and at least one separation plate has a sealing unit for sealing the air hole and the fuel hole. In this case, the convex may have a protruded structure on a different part from the sealing unit.

The sealing unit according to the exemplary embodiment may have a partially-open structure to provide the fuel gas provided from the fuel hole to the convex.

A fluid space may be formed between the convex according to the exemplary embodiment and the sealing unit to flow the fuel gas provided from the fuel hole.

According to another exemplary embodiment, a channel through the fuel gas provided from the fuel hole may be formed in the convex or a part of the first and second separation plates facing the convex.

A height of the convex according to an exemplary embodiment may be the same as or smaller than that of the sealing unit.

The sealing unit according to an exemplary embodiment may include a ceramic material.

A conductive film coated with a contact paste having a conductive material may be formed on the convex according to an exemplary embodiment. In this case, the conductive material may include a non-precious metal material.

At least one of the first and second separation plates according to an exemplary embodiment may include a first flat plate and a second flat plate in contact with the first flat plate and forming the convex structure.

A conductive film coated with a contact paste having a conductive material may be formed on at least one surface of the second flat plate according to an exemplary embodiment.

The second flat plate according to an exemplary embodiment may have a structure joined to the first flat plate by welding.

BRIEF DESCRIPTION OF THE DRAWINGS

The above and other objects, features, and advantages of the present invention will become more apparent to those of ordinary skill in the art by describing exemplary embodiments thereof in detail with reference to the accompanying drawings, in which:

FIG. 1 is an exploded perspective view of a fuel cell stack structure according to an exemplary embodiment of the present invention;

FIG. 2 is a cross-sectional view of first and second separation plates of the stack structure shown in FIG. 1;

FIGS. 3A and 3B specifically illustrate a state in which the first and second separation plates shown in FIG. 2 are connected to each other;

FIG. 4 illustrates a state in which a fuel gas flows between the first and second separation plates shown in FIG. 2 according to an exemplary embodiment;

FIG. 5 illustrates a state in which a fuel gas flows between the first and second separation plates shown in FIG. 2 according to another exemplary embodiment;

FIG. 6 is a cross-sectional view illustrating first and second separation plates of a the cell stack structure according to another exemplary embodiment of the present invention; and FIGS. 7A and 7B are cross-sectional views specifically illustrating a state in which the first and second separation plates shown in FIG. 6 are connected to each other.

DETAILED DESCRIPTION OF EXEMPLARY EMBODIMENTS

Hereinafter, a fuel cell stack structure according to an exemplary embodiment of the present invention will be described in detail with respect to the accompanying drawings. Since the present invention may be modified in various types and have various forms, specific exemplary embodiments are illustrated in the drawings and fully explained in the specification. However, it should be understood that the present invention is not limited to the specific type disclosed, but includes all of the modifications, equivalents or alternatives included in the spirit and scope of the present invention. To explain the drawings, like reference numerals denote like components. In the accompanying drawings, dimensions of the structures are enlarged for the purpose of clarity.

The terms "first" and "second" may be used to explain various components, but the components should not be limited to the terms. The terms are only used to discriminate one component from another component. For example, without departing from the scope of the present invention, a first component may be referred to as a second component, and similarly, a second component may also be referred to as a first component.

The terms used in the present invention are merely used to explain specific embodiments, and are not intended to limit the present invention. Singular expressions, unless clearly defined otherwise in the context, include plural expressions. It should be understood that the term "comprise" or "include" used herein indicates that a characteristic, a number, a step, an operation, a component, a part or a combination thereof described in the specification is present, but does not preclude the possibility of the presence or addition of at least one different characteristic or number, step, operation, component, part or combination thereof.

Meanwhile, unless defined otherwise, all of the terms used herein, including technical or scientific terms, have the same meaning as generally understood by those of ordinary skill in the art including the present invention. The terms defined in a generally used dictionary should be interpreted to match the contextual meaning of the related art, and unless clearly defined in the present invention, should not be interpreted as idealistic or excessively formal meanings.

FIG. 1 is an exploded perspective view of a fuel cell stack structure according to an exemplary embodiment of the present invention, and FIG. 2 is a cross-sectional view of first and second separation plates of the fuel cell stack structure shown in FIG. 1.

Referring to FIGS. 1 and 2, a fuel cell stack structure 1000 according to an exemplary embodiment of the present invention includes first and second cell modules 100 and 200 and first and second separation plates 300 and 400.

The first and second cell modules 100 and 200 include one or more stacked fuel cells 110, respectively, and are disposed to face each other. Here, the fuel cell 110 includes an electrolyte layer (not shown), and a cathode layer (not shown) and an anode layer (not shown) respectively disposed on both surfaces of the electrolyte layer, and generates electricity. For example, the fuel cell 110 generates electricity by an electrochemical reaction between hydrogen and oxygen through ion conduction in the electrolyte layer when an air including oxygen and a fuel gas including hydrogen flow to the cathode layer and the anode layer, respectively. Here, the electrolyte layer may be formed of a ceramic material having high ion conductivity, excellent stability in an excellent redox atmosphere and an excellent mechanical property. For example, the electrolyte layer may be formed of yttria-stabilized zirconia (YSZ), (La, Sr)(Ga, Mg)$O_3$, Ba(Zr,Y)$O_3$, Gd doped $CeO_2$ (GDC), $Y_2O_3$ doped $CeO_2$ (YDC), etc. The fuel cell 110 including such an electrolyte layer is usually referred to as a solid oxide fuel cell (SOFC), and operated at a high temperature of approximately 600 to 1000° C. In addition, the cathode layer may be formed in a porous structure using lanthanum strontium manganite (LSM) or lanthanum strontium cobalt ferrite (LSCF) for oxygen migration. Here, the lanthanum strontium manganite (LSM) is a composite of lanthanum (La), strontium (Sr) and manganese (Mn), and lanthanum strontium cobalt ferrite (LSCF) is a composite of lanthanum (La), strontium (Sr), cobalt (Co) and iron (Fe). In addition, the anode layer may be formed in a porous structure using a mixture of yttria-stabilized zirconia (YSZ) and nickel (Ni) for hydrogen migration.

In addition, each of the first and second cell modules 100 and 200 includes an interconnector 120 disposed between adjacent ones of the stacked fuel cells 110 to electrically connect the fuel cells in series to obtain a high voltage therefrom. The interconnector 120 is electrically connected with the cathode layer of one of the adjacent fuel cells 110 and the anode layer of the other of the adjacent fuel cell 110. For example, the interconnector 120 may be in contact with the cathode layer of one of the adjacent fuel cells 110 and the anode layer of the other of the adjacent fuel cell 110.

In addition, the interconnector 120 may have channel forming units 124 serving as partitions to form a plurality of channels 122 through which the air or fuel gas uniformly flows. Here, since each of top and bottom surfaces of the interconnector 120 is electrically connected in series with the cathode layer of one fuel cell 110 and the anode layer of the other fuel cells 110, the channel forming units 124 may be formed on both of the top and bottom surfaces of the interconnector 120.

In addition, in order to independently provide the air and the fuel gas to the top and bottom surfaces of the interconnector 120, respectively, first air holes 126 through which the air is provided and exhausted are formed in first and second sides of the interconnector 120, respectively, which are disposed opposite to each other, and first fuel holes 128 through which the fuel gas is provided and exhausted are formed in third and fourth sides of the interconnector 120, respectively, which are disposed opposite to each other. For example, the first and second sides may be disposed along a first direction and the third and fourth sides may be disposed along a second direction substantially perpendicular to the first direction.

The first and second separation plates 300 and 400 are disposed between the first and second cell modules 100 and 200 facing each other. The first and second cell modules 100 and 200 may be electrically connected by the first and second separation plates 300 and 400, and may be separably combined to each other by the first and second separation plates 300 and 400. In embodiments, the first and second separation plates 300 and 400 may be separated from each other. Therefore, when the fuel cell 100 included in any one of the first and second cell modules 100 and 200 has a defect, the module having the defective fuel cell may be separated and changed. In addition, as the first and second separation plates 300 and 400 may be electrically connected, electricity generated from the first and second cell modules 100 and 200 may be collected together.

In embodiments, it was described that two cell modules 100 and 200 are separably combined to each other and electrically connected by the first and second separation plates 300 and 400, but if provided that the first and second separation plates 300 and 400 are disposed therebetween, the number of the cell modules 100 and 200 may be changed without limitation.

In embodiments, the first separation plate 300 is disposed between the first cell module 100 and the second cell module 200 to face the bottom of the first cell module 100. Therefore, the first separation plate 300 has a structure in which a top surface is electrically connected with the fuel cell 110, and the bottom surface is exposed to an external environment. In this case, the top surface of the first separation plate 300 may have the same structure as the top or bottom surface of the interconnector 120 to flow the air or fuel gas to the cathode layer or anode layer of the fuel cell 110. Alternatively, the interconnector 120 may be further disposed between the top surface of the first separation plate 300 and the fuel cell 110 to electrically connect the top surface of the first separation plate 300 with the fuel cell 110.

The first separation plate 300 may be formed of an stainless steel material such as SUS material to have a heat resistance to the fuel cell 110 operated at a high temperature of approximately 600 to 1000° C. and have electrical conductivity. In this case, to prevent a decrease in electrical conductivity due to the formation of a $CrO_2$ film formed through oxidation of a poisoning material, Cr, on the first separation plate 300, a coating film (not shown) may be formed on the first separation plate 300. For example, the coating film may be formed of lanthanum strontium manganite (LSM) or lanthanum strontium cobalt ferrite (LSCF). In addition, the coating film may be formed of a mixed material including at least one selected from manganese (Mn), cobalt (Co), copper (Cu), iron (Fe), nickel (Ni), zinc (Zn), tin (Sn) and titanium (Ti). In this case, since the interconnector 120 may also be in the same environment as the first separation plate 300, it may be formed of the same material as the first separation plate 300.

In addition, the first separation plate 300 may include second air holes 310 and second fuel holes 320 communicating with the first air holes 126 and the first fuel holes 128, respectively, to provide the air and the fuel gas to the cathode layer and the anode layer of the fuel cell 110 included in the first cell module 100.

The second separation plate 400 is disposed between the first separation plate 300 and the second cell module 200 to face the top of the second cell module 200. Accordingly, a top surface of the second separation plate 400 is connected with the exposed bottom surface of the first separation plate 300, and a bottom surface of the second separation plate 400 is electrically connected with the fuel cell 110. A structure of the second separation plate 400 may be the same as that of the first separation plate 300, but reversed. The second separation plate 400 is electrically connected in series through area contact with the first separation plate 300 for collecting electricity generated from the first and second cell modules 100 and 200. To this end, the second separation plate 400 may also be formed of the same material as the first separation plate 300 to have a resistance to a high temperature and have electrical conductivity.

In addition, the second separation plate 400 may include third air holes 410 and third fuel holes 420 communicating with the second air holes 310 and the second fuel holes 320, respectively, to provide the air and the fuel gas to the cathode layer and anode layer of the fuel cell 110 included in the second cell module 200. In this case, sealing units 430 may be disposed on the second separation plate 400, when in area contact with the first separation plate 300, to seal around the second and third air holes 310 and 410 and the second and third fuel holes 320 and 420. Therefore, the sealing units 430 may be formed on edges of the first and second separation plates 300 and 400 due to locations at which the second and third air holes 310 and 410 and the second and third fuel holes 320 and 420 communicate with the first air holes 126 and the first fuel holes 128.

For this reason, the first separation plate 300 includes a convex 330 protruded to the second separation plate 400. The convex 330 may prevent break of the surface contact of the first separation plate 300 and the second separation plate 400 caused by the sealing unit 430 disposed therebetween. The convex 330 may be formed at a center portion of the first separation plate 300.

Hereinafter, although the sealing unit 430 is disposed between the first separation plate 300 and the second separation plate 400, a structure in which the first and second separation plates 300 and 400 are in surface contact with each other due to the convex 330 of the first separation plate 300 will also be described in further detail with additional reference to FIGS. 3A and 3B.

FIGS. 3A and 3B are views specifically illustrating a state in which the first and second separation plates shown in FIG. 2 are connected to each other.

Further referring to FIGS. 3A and 3B, a height H1 of the convex 330 of the first separation plate 300 may be substantially the same as or smaller by a predetermined value than that of the sealing unit 430 of the second separation plate 400.

Therefore, the centers of the first and second separation plates 300 and 400 may have an electrical and stable area contact with each other due to the convex 330 even when the sealing unit 430 having a predetermined height H2 is disposed between edge portions of the separation plates 300 and 400, or fine unevenness or a processing error during processing is generated. Accordingly, since the convex 330 may reduce an electrical contact resistance between the separation plates 300 and 400 by the convex 330, electricity generated from the first and second cell modules 100 and 200 may be more efficiently collected. As an example, when the convex 330 is not formed on the first separation plate 300, the amount of electric power collected from the first and second cell modules 100 and 200 is approximately 900 W, but when the convex 330 is formed on the first separation plate 300 as described in the present invention, an amount of collected electric power is approximately 950 W, and it is confirmed that the collection efficiency is improved by approximately 5.3%.

In addition, as the convex 330 is formed on the first separation plate 300, the sealing unit 430 of the second separation plate 400 may be formed of a ceramic material having a slightly lower elasticity but excellent heat resistance to be stably resistant to a high temperature of approximately 600 to 1000° C. at which the fuel cell 110 is operated. As an example, the sealing unit 430 may be formed of a mica material or felt. In addition, as the sealing unit 430, a glass sealer having excellent sealability may be used, and in this case, due to the property of the glass, the glass may flow. To suppress this, the flowability may be controlled by adding a fiber. As described above, the sealing unit 430 may be formed of any material which can be resistant to a high temperature at which the fuel cell 110 is operated, even though having lower or no elasticity, due to the convex 330 of the first separation plate 300.

In addition, a conductive film 332 coated with a contact paste having a conductive material on a surface facing the second separation plate 400 may be formed on the convex 330 of the first separation plate 300. Therefore, even though the surface of the convex 330 is partially uneven, the conductive film 332 may be evenly formed due to predetermined flowability of the contact paste material, thereby providing a more stable electrical contact between the first and second separation plates 300 and 400.

Meanwhile, in the exemplary embodiment, it is described that the convex 330 is formed on the first separation plate 300, and the sealing unit 430 is disposed on the second separation plate 400. However, since the first and second separation plates 300 and 400 are substantially connected with each other through area contact, alternatively, the convex 330 may be formed on the second separation plate 400, the sealing unit 430 may be disposed on the first separation plate 300, or both of the convex 330 and the sealing unit 430 may be formed or disposed on any one of the first and second separation plates 300 and 400.

Hereinafter, a structure which can make a more stable electrical contact between the first and second separation plates 300 and 400 will be described in further detail with reference to FIGS. 4 and 5.

FIG. 4 illustrates a state in which a fuel gas flows between the first and second separation plates shown in FIG. 2 according to an exemplary embodiment.

Referring to FIG. 4, the sealing unit 430 disposed on the second separation plate 400 may have openings 432 to provide the fuel gas including hydrogen provided from at least one of the third fuel holes 420 to the convex 330 formed on the first separation plate 300.

Therefore, as a reducing atmosphere is formed around the convex 330 by the hydrogen included in the fuel gas provided from the opening 432, the oxidation of the conductive film 332 of FIG. 3A coated on the convex 330 and the second separation plate 400 in electrical contact therewith may be fundamentally prevented. Accordingly, since the oxidized film capable of increasing an electrical resistance is not formed on the conductive film 332 in FIG. 3A and the second separation plate 400 in contact therewith, a more stable electrical contact between the first and second separation plates 300 and 400 may be provided.

Therefore, the conductive material included in the contact paste to form the conductive film 332 of FIG. 3A may include all metal materials, regardless of a precious metal material or a non-precious metal material, due to the reducing atmosphere. For example, the conductive material may include at least one of precious metal materials such as gold (Au), silver (Ag) and palladium (Pd) and non-precious metal materials such as manganese (Mn), cobalt (Co), copper (Cu), iron (Fe), nickel (Ni), zinc (Zn), tin (Sn) and titanium (Ti).

In addition, in order to entirely expose the conductive film 332 of FIG. 3A and the second separation plate 400 in contact therewith to the hydrogen included on the fuel gas in, a fluid space 334 may be formed to flow the hydrogen between the convex 330 and the sealing units 430. Particularly, the convex 330 may be spaced a predetermined distance apart from the sealing unit 430 by the fluid space 334. In this case, the fluid space 334 may be entirely formed around the convex 330 to totally disperse the hydrogen on the conductive film 332 of FIG. 3A and the second separation plate 400 in contact therewith. In addition, the opening 432 of the sealing unit 430 may be formed on all of the third and fourth sides at which the third fuel holes 420 are formed, but as long as the opening 432 is formed in any one of the third and fourth sides, it is safely expected to obtain the above-described effect.

In the exemplary embodiment, it was described that the fuel gas is provided through the opening 432 of the sealing unit 430 from the third fuel hole 420 of the second separation plate 400, but since the third fuel holes 420 are substantially communicating with the second fuel hole 320 of FIG. 2 of the first separation plate 300, the fuel gas is provided from the second fuel hole 320 of FIG. 2 is considered to have substantially the same meaning as the fuel gas is provided from the third fuel hole 420.

In addition, FIG. 4 illustrates that the opening 432 is formed in all portions of the sealing units 430 corresponding to the third fuel holes 420. However, since, substantially, the fuel gas has only to be provided to the convex 330, the above-described effect may be expected as long as the opening 432 is only formed in the sealing unit 430 corresponding to any one of the third fuel holes 420 providing the fuel gas.

FIG. 5 illustrates a state in which a fuel gas flows between the first and second separation plates shown in FIG. 2 according to another exemplary embodiment.

In the exemplary embodiment, the structure is substantially the same as shown in FIG. 4, except the structure of the convex for dispersing a fuel gas on all of the conductive film and the second separation plate in contact therewith, and thus like reference numeral denote like structures, and the duplicated detail descriptions will be omitted.

Referring to FIG. 5, at least one second channel 384 may be formed in the convex 380 of the first separation plate 350 to flow the fuel gas provided from the openings 482 of the sealing unit 480.

Accordingly, the second channel 384 may be formed along a perpendicular direction to the second and third sides at which the third fuel holes 470 are formed to flow the fuel gas. In addition, a plurality of the second channels 384 may be formed at regular intervals in the perpendicular direction. Here, to easily form the second channel 384, the second channels 384 may be formed by partially applying the contact paste on the convex 380 when the conductive film 332 of FIG. 3A is formed. Alternatively, the second channels 384 may be formed in a part, facing and contacting the conductive film 332 of FIG. 3A, of the second separation plate 400, not in the convex 330. Therefore, a reducing atmosphere is formed in the convex 380 by the hydrogen included in the fuel gas provided to the second channel 384 from the opening 482, and thus the oxidation of the conductive film 332 of FIG. 3A coating the convex 380 and the second separation plate 450 in electrical contact therewith may be fundamentally prevented.

In this case, since, in the part in which the second channel 384 is formed, the conductive film 332 of FIG. 3A of the convex 380 is not in electrical contact with the second separation plate 450, it is preferable to minimize the number and width of the second channels. For example, at the location adjacent to the opening 482 of the sealing unit 480, the width and number of the second channels 384 may be relatively decreased, and as the second channel 384 apart from the opening 482, the width and number may be relatively increased. This is because a pressure of the fuel gas provided from the third fuel holes 470 at the location adjacent to the opening 482 of the sealing unit 480 is higher than at other locations.

Referring again to FIG. 1, the stack structure may further include manifold-type upper and lower cases 500 and 600, which are respectively disposed on the uppermost and the lowermost thereof, between which the first and second cell modules 100 and 200 are stacked, to protect the first and second cell modules 100 and 200 and the first and second separation plates 300 and 400 from an external environment and provide a total strength.

First and second connection sockets 510 and 520 connected to an external air provider (not shown) and a fuel gas provider (not shown) may be formed in the upper case 500 to provide the air and the fuel gas to the cathode layer and the anode layer of the fuel cell 110 through the first, second and third air holes 126, 310 and 410 and the first, second and third fuel holes 128, 320 and 420, respectively. Such first and second connection sockets 510 and 520 may be respectively formed at sides of the upper case 500 perpendicular to each other to independently provide an air or fuel gas to the cathode layer and the anode layer of the fuel cell 110. In the exemplary embodiment, it is described that the first and second connection sockets 510 and 520 are formed in the upper case 500, but the above-described function may be sufficiently performed by forming the first and second connection sockets 510 and 520 at the same locations of the lower case 600.

FIG. 6 is a cross-sectional view illustrating first and second separation plates of a fuel cell stack structure according to another exemplary embodiment of the present invention, and FIGS. 7A and 7B are cross-sectional views specifically illustrating that the first and second separation plates shown in FIG. 6 are connected to each other.

In the exemplary embodiment, the structure is substantially the same as those illustrated in FIGS. 2, 3A and 3B, except a structure in which a convex is formed between the first and second separation plates, and since like reference numerals denote like components, duplicated detail descriptions will be omitted.

Referring to FIGS. 6, 7A and 7B, a first separation plate 700 of a stack structure 2000 for fuel cells according to another exemplary embodiment of the present invention may include a first flat plate 710 having conductivity in which the second air holes 310 of FIG. 1 and second fuel holes 712 are formed, and a second flat plate 720 in contact with a center of the first flat plate 710 to perform the function of the convex 330 of FIG. 2.

Therefore, as a second separation plate 800 on which a sealing unit 810 is disposed at an edge and the first flat plate 710 of the first separation plate 700 may have a stable area contact with each other due to the second flat plate 720, an electrical resistance between them may be reduced, and thus electricity generated from the first and second cell modules 100 and 200 may be efficiently collected. Particularly, since the first and second flat plates 710 and 720 are manufactured in a simple flat structure in the exemplary embodiment, an additional advantage of easy manufacturing of the stack structure 2000 may be expected.

In addition, first and second conductive films 722 and 724 coated with a contact paste having a conductive material may be formed on both surfaces of the second flat plate 720 facing the first flat plate 710 and the second separation plate 800, respectively. Therefore, even though a surface of the first flat plate 710 is partially uneven, the first and second conductive films 722 and 724 may be evenly formed by predetermined flowability of the contact paste material, and thus the second flat plate 720 may have a more stable electrical contact with the second separation plate 800 while in stable contact with the first flat plate 710. Here, the first and second conductive films 722 and 724 may have substantially the same structure as the conductive film 332 shown in FIG. 3A.

In addition, the increase in electrical resistance which may be generated by partial spacing between the first and second flat plates 720 and 710 may be prevented by stably joining the second flat plate 720 to the first flat plate 710 by welding. Particularly, in this case, since the second flat plate 720 is very stably joined to the first flat plate 710 by welding, even though there is no first conductive film 722 of the second flat plate 720, facing the first flat plate 710, the increase in electrical resistance between them may be prevented.

Meanwhile, in the exemplary embodiment, while it is described that the first separation plate 700 includes the first and second flat plates 710 and 720, even when the second separation plate 800 includes the first and second flat plates 710 and 720, the same effect may be expected.

While the stack structure of the present invention described above is applied to a solid oxide fuel cell (SOFC) using a ceramic as an electrolyte, it should be understood that it may also be applied to a different type of fuel cell such as the molten carbonate fuel cell (MCFC), phosphoric acid fuel cell (PAFC) or solid-type fuel cell (PEFC), capable of having a stack structure, to increase the amount of electric power.

According to the present invention, in a fuel cell stack structure, as at least one of the first and second separation plates, which are disposed between the first and second cell modules in which at least one fuel cell is stacked to separate and electrically connecting them, has a convex protruded toward the other separation plate, a stable and even electrical contact between the first and second separation plates can be provided.

Particularly, even when a sealing unit for sealing an air hole and a fuel hole that provide an air including oxygen and a fuel gas including hydrogen to the fuel cell is disposed between the first and second separation plates, a stable electrical contact between the separation plates may be provided by the convex. As a result, collection efficiency of the fuel cell stack structure in which the first and second cell modules are stacked can be improved by reducing an electrical resistance between the first and second separation plates.

As described above, since, in a stack structure in which cell modules having at least one fuel cell is stacked, at least one of first and second separation plates electrically connected to each other to separate the cell modules has a convex protruded toward the other separation plate, an stable electrical contact between the first and second separation plates is provided to reduce an electrical resistance, and therefore collection efficiency of the fuel cell stack structure can be improved.

While the present invention has been shown and described with reference to certain exemplary embodiments thereof, it will be understood by those skilled in the related art that various changes in form and details may be made therein without departing from the gist and scope of the present invention as defined by the appended claims.

What is claimed is:

1. A fuel cell stack structure, comprising:
   first and second cell modules, each of which includes one or more fuel cells stacked, the fuel cell including an electrolyte layer, and a cathode layer and an anode layer on both surfaces of the electrolyte layer, respectively, and capable of generating electricity;
   a first separation plate disposed between a lower surface of the first cell module and an upper surface of the second cell module to be electrically connected to the first cell module, the first separation plate configured to provide a first fuel inlet hole and a first fuel outlet hole, which are separated from each other, through which a fuel gas including hydrogen flows and configured to provide a first air hole through which an air including oxygen flows;
   a second separation plate disposed between the upper surface of the second cell module and a lower surface of the first separation plate to be electrically connected to the second cell module, the second separation plate configured to provide a second fuel inlet hole and a second fuel outlet hole, which are separated from each other, communicating with the first fuel inlet hole and the first fuel outlet hole, respectively, configured to provide a second air hole communicating with the first air hole; and
   a sealing unit disposed between the lower surface of the first separation plate and an upper surface of the second separation plate to make direct contact with the lower surface of the first separation plate and an upper surface of the second separation plate and to seal the fuel holes and the air holes,
   wherein one of the first and second separation plates comprises a protruded convex making contact with the other of the first and second separation plates to improve an electrical contact between the first and second separation plates, and
   wherein the sealing unit comprises a first portion defining a first space which communicates with the first and second fuel inlet holes, a second portion defining a second space which communicates with the first and second fuel outlet holes, and a third portion defining a third space which receives the protruded convex, and
   wherein the sealing unit allows the third space to communicate with only one of the first space and the second space, and
   wherein the fuel gas is supplied to the anode layer and the air is supplied to the cathode layer.

2. The fuel cell stack structure according to claim 1, wherein the first portion of the sealing unit has an opening partially opened to provide a fuel gas to the protruded convex.

3. The fuel cell stack structure according to claim 1, wherein a channel through which the fuel gas provided from the fuel hole flows is formed in the convex or a part of the first and second separation plates facing the convex.

4. The fuel cell stack structure according to claim 1, wherein a height of the convex is the same as or smaller than that of the sealing unit.

5. The fuel cell stack structure according to claim 1, wherein the sealing unit includes a ceramic material.

6. The fuel cell stack structure according to claim 1, wherein a conductive film coated with a contact paste having a conductive material is formed on the convex.

7. The fuel cell stack structure according to claim 1, wherein the one of the first and second separation plates, comprises:
   a first flat plate; and
   a second flat plate in contact with the first flat plate and forming the convex.

8. The fuel cell stack structure according to claim 7, wherein a conductive film coated with a contact paste having a conductive material is formed on at least one surface of the second flat plate.

9. The fuel cell stack structure according to claim 8, wherein the conductive material includes a non-precious metal material.

10. The fuel cell stack structure according to claim 7, wherein the second flat plate is joined to the first flat plate by a welded joint.

* * * * *